United States Patent [19]
Kodama

[11] Patent Number: 5,606,468
[45] Date of Patent: Feb. 25, 1997

[54] PLURAL DIVERSE PROCESSORS FOR CONTROL OF A DISK APPARATUS

[75] Inventor: Koji Kodama, Odawara, Japan

[73] Assignee: Hitachi, Ltd., Tokyo, Japan

[21] Appl. No.: 407,823

[22] Filed: Mar. 21, 1995

[30] Foreign Application Priority Data

Mar. 28, 1994 [JP] Japan ................................ 6-057436

[51] Int. Cl.$^6$ ............................. G11B 33/00; G05B 15/02
[52] U.S. Cl. ........................................... 360/75; 360/137
[58] Field of Search ............................ 395/438, 439; 364/133, 135; 360/69, 75, 137

[56] References Cited

U.S. PATENT DOCUMENTS

| | | | |
|---|---|---|---|
| 4,591,933 | 3/1986 | Quackenbush | 360/78.07 |
| 4,622,604 | 11/1986 | Hashimoto et al. | 360/78.07 |
| 4,627,039 | 12/1986 | Meyer | 369/44.28 |
| 4,799,112 | 1/1989 | Bremmer et al. | 360/31 |
| 4,819,153 | 4/1989 | Graham et al. | 362/200 |
| 4,864,437 | 9/1989 | Couse et al. | 360/75 |
| 4,899,234 | 2/1990 | Genheimer | 360/78.06 |
| 4,920,462 | 4/1990 | Couse et al. | 360/78.04 |
| 4,979,056 | 12/1990 | Squires et al. | 360/69 |
| 5,087,996 | 2/1992 | Williams et al. | 360/78.01 |
| 5,109,307 | 4/1992 | Sidman | 360/77.05 |
| 5,261,058 | 11/1993 | Squires et al. | 364/DIG. 2 |

FOREIGN PATENT DOCUMENTS

| | | |
|---|---|---|
| 0601894 | 6/1994 | European Pat. Off. . |
| 0600497 | 6/1994 | European Pat. Off. . |
| 415548B | 3/1992 | Japan . |

OTHER PUBLICATIONS

Zilog Catalog Mass Storage p. 5–4, date (?).
Patent Abstracts of Japan, vol. 017, No. 650 (p–1652), Dec. 2, 1993 and JP-A-05 210925 (Hitachi Ltd), Aug. 20, 1993.
Patent Abstracts of Japan, vol. 012, No. 253 (P–731), Jul. 16, 1988 & UP-A-63 041970 (Sanyo Electric Co., Ltd.), Feb. 23, 1988.
Patent Abstracts of Japan, vol. 012, No. 494 (P–805), Dec. 23, 1988 & JP-A-63 205756 (Hitachi, Ltd.: Others), Aug. 25, 1988.
Patent Abstracts of Japan, vol. 015, No. 184 (P–1200), May 13, 1991 & JP-A-03 041684 (Matsushita Electric Ind. Co., Ltd., Feb. 22, 1991.
Patent Abstracts of Japan, vol. 014, No. 064 (P–1002), Feb. 6, 1990 & JP-A-01 286179 (NEC Corp.), Nov. 17, 1989.
Electronic Design, Aug. 25, 1988, USA, vol. 36, No. 19, ISSN. 0013–4872, pp. 83–90, Yager, C., "Trim head–positioning overhead with embedded disk servo".

*Primary Examiner*—David L. Robertson
*Attorney, Agent, or Firm*—Kenyon & Kenyon

[57] ABSTRACT

Configuration for implementing a control unit of a disk apparatus having functions of high-precision head positioning control and data read/write control and sophisticated interface function with a small size and a low cost. A driver control microprocessor for embedded digital servo processing has a memory of a relatively small capacity and is suited for high-speed processing and an A/D converter. An interface function control microprocessor for generalized control of an interface function device with respect to a high rank device has a memory of a relatively large capacity and is suited for low-speed processing. The driver control microprocessor and the interface function control microprocessor are mounted within a single IC package.

6 Claims, 3 Drawing Sheets

PLURAL DIVERSE PROCESSORS FOR CONTROL OF A DISK APPARATUS

BACKGROUND OF THE INVENTION

The present invention relates to a control unit of a disk apparatus, and in particular to a control unit suitable for a small-sized magnetic disk apparatus for implementing high-precision head positioning demanded as the recording density is increased and implementing higher performance of interface function.

In small-sized magnetic disk apparatuses, for example, higher recording density is being promoted by higher performance of interface function, smaller size of apparatus and larger storage capacity.

For attaining this higher recording density, it is important to increase the track density. As for a high-precision head positioning technique corresponding to higher precision of positioning operation associated with increase in track density, there is an embedded servo scheme using a servo signal recorded intermittently into a disk surface for recording of data (data record area), i.e., so-called servo signal embedded in data record area. In addition, there is a hybrid servo scheme as described in U.S. Pat. No. 5,109,307. According to the hybrid servo scheme, both the servo signal embedded in servo face i.e., a disk surface dedicated to recording of a servo signal and a servo signal recorded in data record area are used. During seek operation, seek speed is increased by using the servo signal embedded in servo face which has been continuously written into the servo face.

As a head positioning servo circuit scheme associated with such a servo scheme, a digital servo circuit scheme using a microprocessor is suitable from the viewpoint of flexible application and higher integration of circuit as described in JP-B-4-15548. As for the microprocessor conducting digital servo processing and having a number of quantization steps and a sampling period required for implementing a positioning precision and a response speed which are equal in level to those of a conventional analog servo circuit scheme, there is needed a speed far higher than that of a microprocessor included in the analog servo circuit scheme to conduct servo processing.

Furthermore, with the advance of higher density recording of data in magnetic disk apparatuses, a much higher speed is required of the microprocessor as described hereafter.

As a recording scheme for equalizing linear recording densities in an inner periphery and an outer periphery on the data record area and thereby increasing the area recording density, there is a so-called zone bit recording scheme. In the zone bit recording scheme, the data record area is divided into a plurality of zones in order beginning from the innermost of the data record area and the number of sectors is made larger in an outer periphery zone located outside than in an inner periphery zone located inside as described in U.S. Pat. No. 4,799,112. Small-sized magnetic disk apparatuses adopting this scheme are now increasing. In this scheme, however, the number of sectors changes when high-speed seek operation is conducted over a plurality of zones. As compared with a disk apparatus which does not adopt the zone bit recording scheme, therefore, changeover processing attendant upon the change of the number of sectors with respect to the radial direction of the disk is needed as additional processing. Because of this changeover processing, the microprocessor bears a heavier load.

The speed of disk rotation was typically 3600 revolutions/minute, for example, in the past. In the recent times, however, the waiting time of disk rotation at the time of data access is shortened and the speed of disk rotation for transferring data at high speed is increased. A speed of disk rotation as high as 7200 revolutions/minute is thus demanded.

In this way, high speed is increasingly required of the microprocessor used for head positioning and data read/write control.

On the other hand, there are several kinds as interface between a small-sized magnetic disk apparatus and external devices. As representative interface, there is SCSI (Small Computer System Interface) standardized by ANSI (American National Standard Institute). Even after SCSI which is the first standard, SCSI is subjected to substantial function extension including support commands such as SCSI-2 and then SCSI-3. In response to this, the capacity of the program storing memory needed by an interface control microprocessor of magnetic disk apparatuses has increased.

Among controls exercised by the control unit of the magnetic disk apparatus, principal ones are head positioning control, data read/write control and interface control. As for such architecture that these controls are exercised by a single microprocessor, one described in U.S. Pat. No. 4,819,153 and one described in U.S. Pat. No. 4,979,056 can be mentioned.

Typically in small-sized magnetic disk apparatuses, mechanism for head positioning control and data read/write control is made essentially the same and a plurality of variant models having different interface specifications, i.e., different interface controls for exercising input/output control of data with respect to the outside are developed and produced.

If an apparatus control system for exercising head positioning control employing a digital servo scheme using an embedded servo scheme or a hybrid servo scheme and for exercising data read/write control and an interface function control system relating to input/output control of data with respect to the outside are implemented by a single microprocessor, interface control processing is kept waiting because of digital servo control processing having priority higher than that of interface control processing and being responsive to a processing request generated by a periodic servo signal appearing at least every sector, resulting in a lowered processing capability of interface control.

As a countermeasure against this, there is a method of increasing the speed of processing of the microprocessor, i.e., the speed of the clock in order to make waiting time sufficiently short. As compared with the operation speed in the dual-microprocessor configuration, however, an excessively high speed is demanded in the single-microprocessor configuration. From the viewpoint of circuit technique, the cost of a microprocessor becomes higher as the speed of its operation clock is increased. Therefore, it is economically difficult to use such a microprocessor.

As another countermeasure, there is also a method of developing, for each interface specification, a processing scheduling program with special contrivance applied to a combination of interface control processing and digital servo control processing in order to employ the single-microprocessor configuration restrained in speed increase. This development takes time.

As another solution method, a method of using a plurality of microprocessor packages, i.e., a plurality of microprocessors is conceivable. In a small-sized disk apparatus such as a 2.5 inch size disk apparatus having a disk diameter of 67 mm, however, the circuit board space is approximately 70 mm×100 mm. This results in a problem that it is difficult to mount a plurality of microprocessor packages.

A disk drive circuit having product type Z86C95 of Zilog including a CPU and a slave digital signal processor (DSP) in one package is commercially available. However, the digital signal processor is merely used to assist a part of calculation for drive by the CPU.

SUMMARY OF THE INVENTION

An object of the present invention is to provide a small-sized, low-cost control unit of a disk apparatus including an apparatus control system having high-precision head positioning and data read/write functions and an interface function control system capable of coping with diversified and sophisticated interface functions.

In order to solve the above described problem, there is provided in accordance with one aspect of the present invention a control unit of a disk apparatus for exercising at least positioning control of a head of the disk apparatus, control of reading/writing data from/into a disk via the head, and transfer control of data between the disk apparatus and an external device, the control unit including a first microprocessor capable of mainly exercising positioning control of the head and control for reading/writing data from/into the disk, so as to perform head positioning by using a servo signal recorded on a data recording surface of the disk or perform head positioning by using both a servo signal recorded on a disk surface dedicated exclusively to servo signal and a servo signal recorded on a data recording disk surface, a second microprocessor for exercising transfer control of data between the disk apparatus and an external device, a range of clock frequency or instruction execution speed in which the second microprocessor is operable is equivalent to or lower than a range of clock frequency or instruction execution speed in which the first microprocessor is operable, the first microprocessor having a first memory for storing information relating to head positioning control and control of reading/writing data from/into a disk via the head, the second microprocessor having a second memory for storing at least information relating to transfer control of data, the second memory having a capacity larger than that of the first memory, and the first microprocessor and the second microprocessor being sealed into a single integrated circuit package.

In accordance with a preferred aspect, the first microprocessor has an analog-to-digital (A/D) converter for converting the servo signal read out as an analog signal from the disk to a digital signal. The second microprocessor does not have an A/D converter.

As described above, positioning control of a head and control of reading/writing data, and input/output control of data between the disk apparatus and an external device are exercised in parallel by different microprocessors. In implementing equivalent processing capability with respect to the interface function, therefore, necessity of increasing the clock or instruction execution speed is lowered and security of processing capability in view of circuit technique is facilitated as compared with implementation with a single microprocessor. Furthermore, the cost is also lowered.

Furthermore, the first microprocessor having a memory of a relatively small capacity and suited for high-speed processing is suitable for driver control including high-precision head positioning control and data read/write control of an embedded digital servo scheme. The second microprocessor having a memory of a relatively large capacity and suited for relatively lower speed processing is suitable for control of interface function which needs more and more memory capacity in keeping with function expansion of interface specifications. Furthermore, since the first microprocessor does not depend upon difference between interface specifications, it can be used in common or in small modification among disk devices having different interface specifications.

Furthermore, by disposing two microprocessors having different processing contents in the same IC package, they can be mounted in a small space on a substrate of the disk device.

Other objects, features and advantages of the invention will be apparent from the following description of the embodiments in conjunction with the accompanying drawings.

DETAILED DESCRIPTION

Hereafter, embodiments of the present invention will be described by referring to the accompanying drawings.

Figure 1:
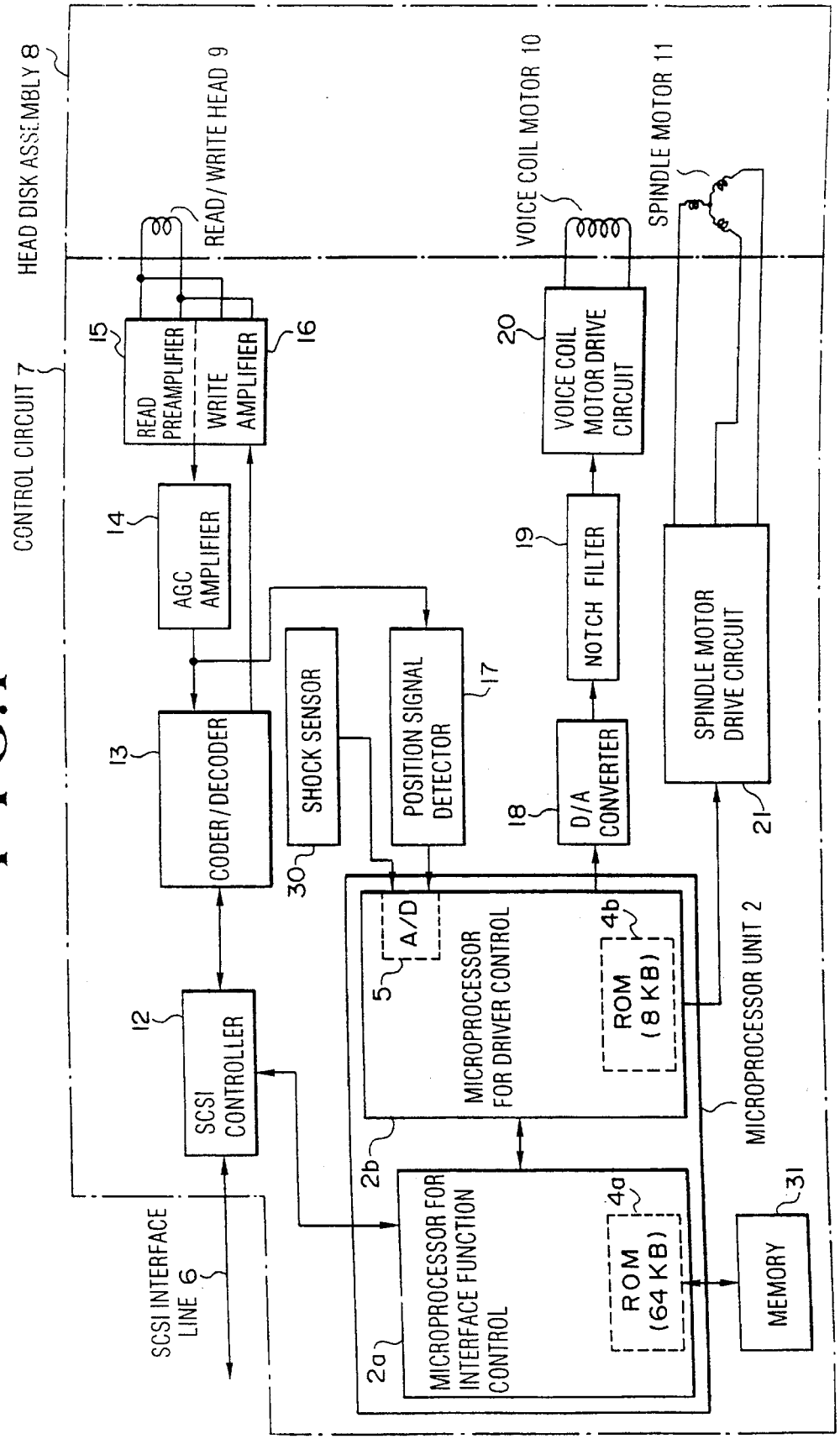
FIG. 1 is a circuit block diagram of a small-sized magnetic disk apparatus according to an embodiment of the present invention.
Figure 2A:
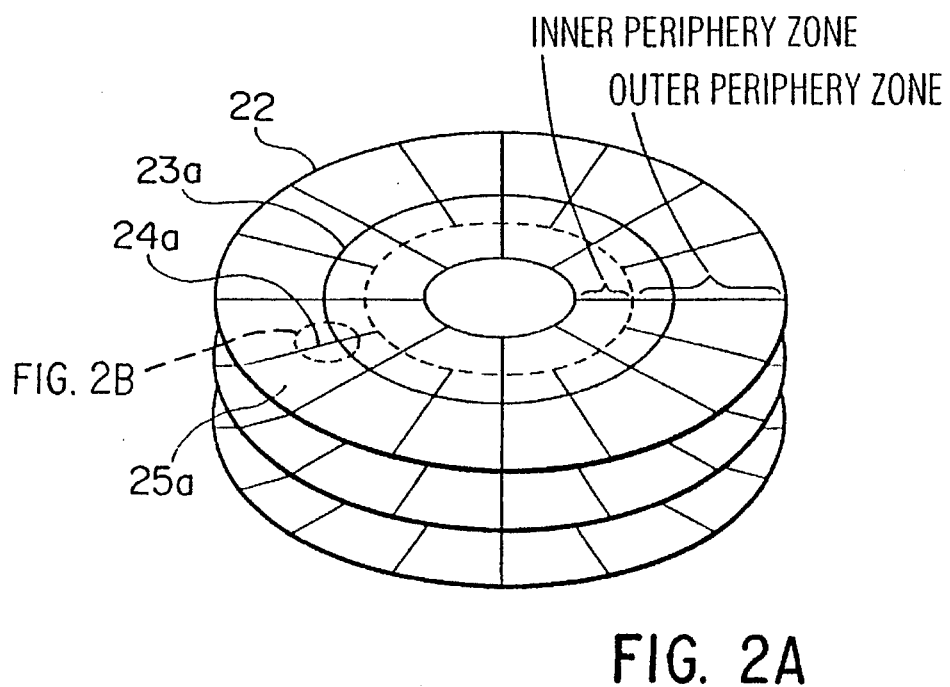
FIGS. 2A and 2B are diagrams of servo signal processing in the embedded digital servo scheme.
Figure 2B:
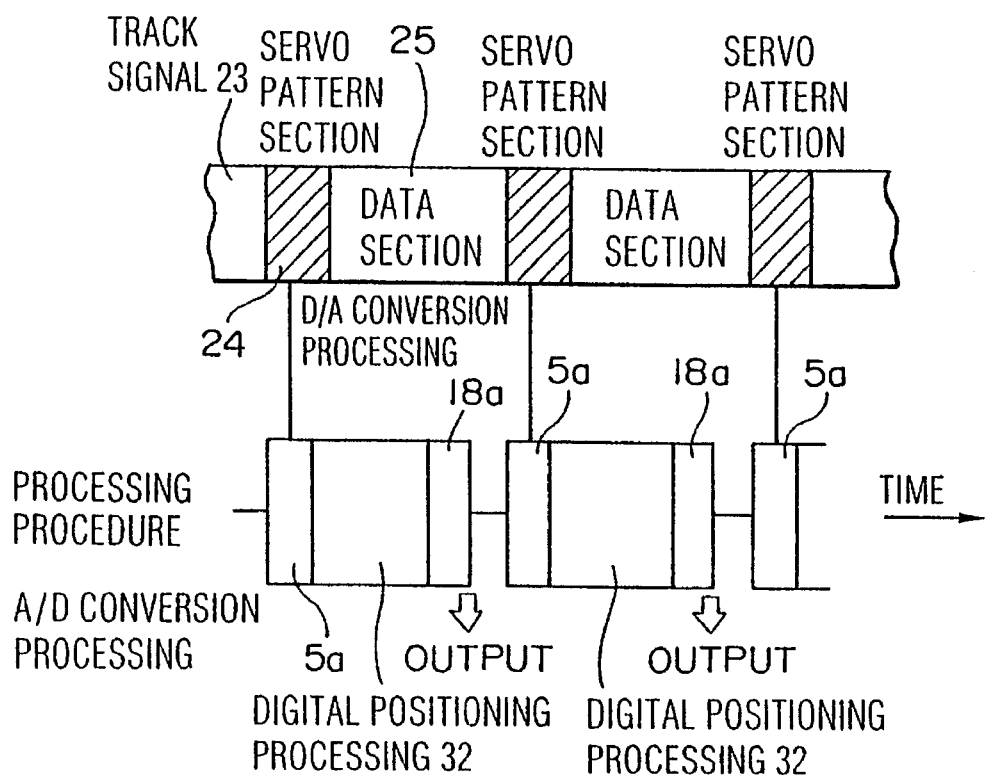

FIG. 1 shows a block diagram of a control circuit of a small-sized magnetic disk apparatus according to the present invention. FIGS. 2A and 2B show a part of servo signal processing in an embedded digital servo scheme.

Figure 3:
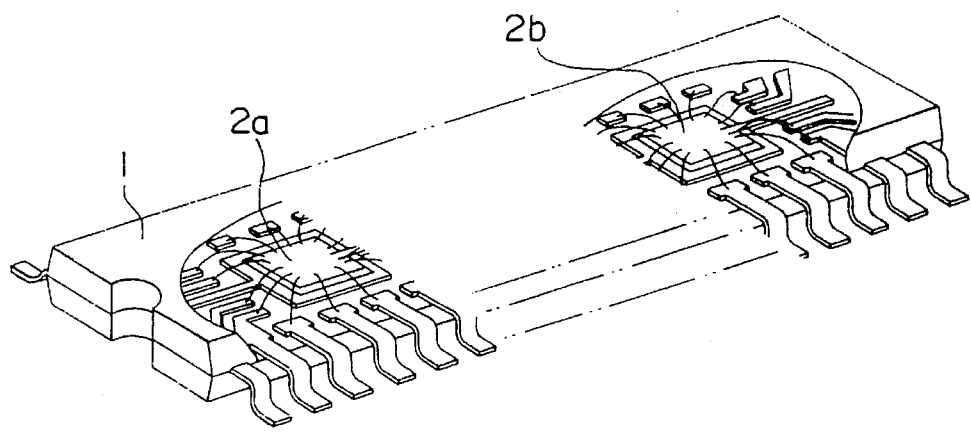
FIG. 3 is a diagram of a microprocessor IC package of a small-sized magnetic disk apparatus according to an embodiment of the present invention.

In FIG. 1, a microprocessor unit 2 mainly forms a control circuit according to the present invention. As shown in FIG. 3, two microprocessors each formed by one chip, i.e., a microprocessor 2a for interface function control and a microprocessor 2b for driver control are sealed in a single package.

As shown in FIG. 1, a magnetic disk apparatus is mainly formed by a head disk assembly (HDA) 8 and a control circuit 7.

The head disk assembly 8 includes a spindle motor 11 for driving and rotating a disk, a read/write head 9 disposed opposite to the disk to perform mutual signal conversion between a magnetic signal and an electric signal, and a voice coil motor 10 for performing track positioning of the read/write head.

The control circuit 7 includes a read preamplifier 15, a write amplifier 16, an AGC amplifier 14 for making the amplitude of a signal read out by the read preamplifier 15 constant, a coder/decoder 13 for coding data to be sent to the write amplifier 16 and decoding a signal supplied from the read preamplifier 15, a position signal detector 17 for demodulating a position signal from servo information, a shock sensor 30, a driver control microprocessor 2b for exercising head positioning control and read/write control on the basis of a physical address and a signal supplied from the shock sensor 30, and a spindle motor drive circuit 21 controlled by the driver control microprocessor 2b, a D/A converter 18 for converting a head positioning signal supplied from the driver control microprocessor 2b to an analog signal, a notch filter 19 for eliminating a resonance point of operation of the head disk assembly 8, and a voice coil motor drive circuit 20. The control circuit 7 further includes an SCSI controller 12 for directly inputting and outputting data, commands and status information via an SCSI interface line 6 connected to the outside, interface function control microprocessor 2a for controlling the SCSI controller 12, associating a logical address with a physical address, and exercising interface control, and a memory 31 such as a cache (and/or supplementary) memory.

The driver control microprocessor 2b accepts input thereof supplied from the microprocessor 2a, such as a physical address including a track number and a sector number on a disk. On the basis of the input, the driver control microprocessor 2b controls the voice coil motor 10 and the spindle motor 11 to exercise head positioning control and controls the read/write circuit to execute read/write processing.

That is, the driver control microprocessor 2b derives track position information and track position deviation information from sector servo information dispersed on a track of the disk. In case of seek, the driver control microprocesor 2b makes a calculation of a seek speed, a calculation of an error from a determined seek speed curve value, and a calculation of a proper current of the voice coil motor based on the error in each sector period by using high-precision digital computation. In following control for making the head follow a predetermined track, the driver control microprocessor 2b digitizes track position deviation information (inputted as an analog signal). By using high-precision digital computation, the driver control microprocessor 2b calculates a current proper to the voice coil motor in a digital servo loop including filter computation within each sector period.

On the basis of external interface inputs such as a read/write command for ordering read/write operation with respect to a logical address including data block No., a status message and data, the interface function control microprocessor 2a issues head positioning and read/write commands with respect to the physical address to the driver control microprocessor 2b. In addition, the interface function control microprocessor 2a controls the memory 31 having cache function for efficiently adjusting the difference between data transfer speed on interface to the outside and the read/write transfer speed on a disk medium. Furthermore, the interface function control microprocessor 2a exercises interface control and control of the disk apparatus based upon external interface specifications and apparatus specifications.

Two microprocessors 2a and 2b are different from each other in operation clock frequency and internal ROM capacity. The driver control microprocessor 2b has an operation clock frequency of 20 MHz, for example. The interface function control microprocessor 2a has an operation clock frequency of 12 MHz, for example. Since high-speed computation is mainly conducted, higher speed is required of the driver control microprocessor 2b than that of the interface function control microprocessor 2a which mainly performs communication control according to communication protocol rather than computation.

The driver control microprocessor 2b has an internal ROM capacity of 8 kbytes, for example. The interface function control microprocessor 2a has an internal ROM capacity of 64 kbytes, for example. The reason is that the driver control microprocessor 2b mainly performs high-speed computation using limited basic computation algorithm as digital servo processing for positioning the head at high accuracy and hence does not need a large memory capacity.

On the other hand, as compared with digital servo computation processing in which the procedure can be represented in brevity by using matrix computation representation, the interface function control microprocessor 2a mainly exercising input/output control of commands and data according to interface standards must store a processing program including many kinds of combinations of condition decision and processing. Furthermore, as seen in amendment of standards from SCSI-1 to SCSI-2, there are a large number of function expansions including addition of commands to be supported such as a queueing command. Furthermore, it is also necessary to make possible changeover to substantially standardized special specifications such as SCSI specifications of special company type responsive to a customer's request even under the same standards.

The driver control microprocessor 2b incorporates an A/D converter for converting a servo position signal and a signal supplied from the shock sensor 30, i.e., analog signals to digital signals. On the other hand, the interface function control microprocessor 2a exercises interface control with respect to external devices. Only the digital system is a subject of direct control. Therefore, the interface function control microprocessor 2a does not incorporate an A/D converter.

Operation of the control system of a small-sized magnetic disk apparatus in the present embodiment will now be described by referring to FIGS. 1 and 2.

A positioning scheme of seek operation and following operation of the head 9 is the embedded digital servo scheme. In this scheme, a signal is first read out from a track 23a on a magnetic disk 22 via the read/write head 9, the read preamplifier 15 and the AGC amplifier 14. From a signal of a servo pattern section 24 included intermittently in a track signal 23 (FIG. 2B), an analog position signal is taken out by the position signal detector 17. The analog position signal is subjected to A/D conversion processing 5a in an A/D converter 5 to be digitized. A digitized position signal is thus obtained. From the signal of the servo pattern section 24, track No. information is also obtained.

On the basis of this, the driver control microprocessor 2b conducts digital positioning control processing 32 using the above described digital computation processing and outputs a control signal for positioning. This signal is subjected to D/A conversion processing 18a in the D/A converter 18. The D/A converted signal is outputted to the voice coil motor 10 via the notch filter 19 and the voice coil motor drive circuit 20. The driver control microprocessor 2b also outputs a signal for driving the spindle motor 11 via the spindle motor drive circuit 21.

The number of servo pattern sections 24a contained in one circumference of the track 23a on the magnetic disk 22 is smaller in an inner periphery zone than in an outer periphery zone. Such a so-called zone bit scheme is adopted to equalize the recording density.

Depending upon a zone that the head positioning track belongs to after seek, the driver control microprocessor 2b immediately performs changeover to a necessary parameter value with respect to various parameters of the read/write system circuit such as the read/write signal frequency, write precompensation value, write current, amplitude slice level of read waveform peak detection and discrimination, and read data discrimination window time width in order to secure and maximize the normal readout margin in each zone.

As for read data, a signal is read via the read/write head 9, read preamplifier 15, AGC amplifier 14 and coder/decoder 13, and is outputted from the SCSI controller 12 to the outside.

Write data are inputted from the outside to the SCSI controller 12 and are written into the magnetic disk 22 through the coder/decoder 13, write preamplifier 16, and the read/write head 9.

In order to improve shock resistance in operation by using the shock sensor, the driver control microprocessor 2b performs polling monitor of a shock acceleration signal supplied from the shock sensor 30. When the driver control microprocessor 2b has detected a shock acceleration signal equal to a predetermined value or more, it immediately exercises write inhibit control in order to prevent off-track writing from destroying data. The off-track writing means writing data into an erroneous track due to track position deviation.

For such control operation of the driver control microprocessor 2b, further increase in speed tends to be demanded because of higher precision of required positioning operation caused by increase in track density and because of higher speed of disk rotation aiming at shortening the rotation wait time until the head arrives at a desired sector after completion of seek operation for a desired track and aiming at increase in data transfer speed. As described above, therefore, increase in clock speed is attempted for the driver control microprocessor 2b. On the other hand, the interface function control microprocessor 2a activated by a lower-speed clock is used for interface control that high speed is not required of.

The interface function control microprocessor 2a is connected to the SCSI controller 12 and the driver control microprocessor 2b. The interface function control microprocessor 2a executes diversified and sophisticated interface function such as control of generalized response with a high rank device, control of storage and readout of corresponding data, and power saving control. Therefore, the capacity of an internal ROM for storing processing program needed by the interface function control microprocessor 2a is approximately eight times the capacity of an internal ROM for storing program needed by the driver control microprocessor 2b.

Timing of operation between two microprocessors 2a and 2b is adjusted as described hereafter. The two microprocessors 2a and 2b have interrupt flags respectively controlled by them on registers, and mutually exercise polling supervision over generation of an interrupt request. When one microprocessor has received an interrupt request from the other microprocessor, independent operation is temporarily interrupted and status information, commands and data are mutually sent and received. Thereby cooperation of operation is implemented.

FIG. 3 shows the structure of an IC package 1 of a microprocessor for a small-sized magnetic disk apparatus according to an embodiment of the present invention. The interface function control microprocessor 2a and the driver control microprocessor 2b are hermetically sealed in the same IC package 1.

Figure 4:
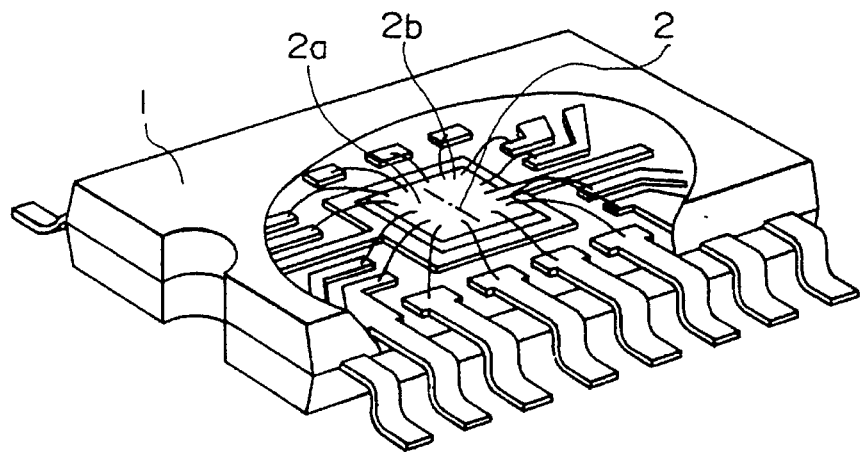
FIG. 4 is a diagram of a microprocessor IC package of a small-sized magnetic disk apparatus according to an embodiment of the present invention.

FIG. 4 shows the structure of an IC package 1 of a microprocessor for a small-sized magnetic disk apparatus according to another embodiment of the present invention. In structure, the circuit of the interface function control microprocessor 2a and the circuit of the driver control microprocessor 2b are integrally formed within a single microprocessor IC chip 2. The microprocessor 2 is hermetically sealed within the IC package 1.

Figure 5:
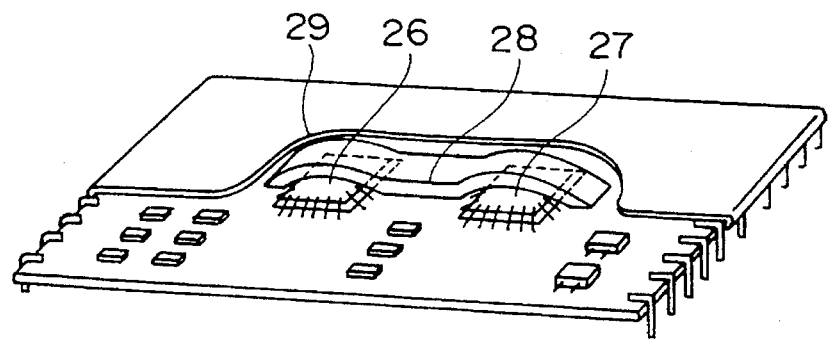
FIG. 5 is a diagram of a hybrid IC including a microprocessor in a different small-sized magnetic disk apparatus according to the present invention.

FIG. 5 shows the structure of a hybrid IC containing microprocessors in a small-sized magnetic disk apparatus according to still another embodiment of the present invention. The interface function control microprocessor bare chip 26 and the driver control microprocessor bare chip 27 are mounted on a single hybrid IC substrate by means of wire bonding or the like. The bare chip is subjected to silicon resin potting seal 28. Furthermore, the entire hybrid IC substrate is subjected to epoxy resin mold seal 29.

The microprocessor package including two microprocessors 2a and 2b, or 26 and 27 shown in FIGS. 3, 4 and 5 is mounted on a circuit board of a small-sized magnetic disk apparatus having a disk diameter of approximately 67 mm or less, i.e., having so-called 2.5 inch form factor size or less.

According to these embodiments heretofore described, two microprocessors having different specifications depending upon processing contents are disposed within the same IC package. As a result, two microprocessors can be mounted in a small space on a circuit board of a small-sized magnetic disk apparatus of 2.5 inch form factor size or less.

A control system having performance equivalent to that of a single microprocessor can be economically realized while avoiding demand upon the microprocessor for excessively high speed, which is a problem caused by using a single microprocessor in the same way as the conventional technique to form (1) a driver control system capable of improving shock resistance in operation, using the zone bit recording scheme, high-speed rotation of the disk and a shock sensor, and including high-precision head positioning of embedded digital servo scheme and data reading and writing, and (2) an interface function control system corresponding to diversified and sophisticated interface function.

By the way, the instruction execution speed of a microprocessor is not determined by the clock frequency alone, but depends upon the instruction configuration and circuit components. For example, a RISC (reduced instruction set computer) type microprocessor is much higher in speed than a CISC (complex instruction set computer) type microcomputer.

By constituting the microprocessors 2a and 2b respectively as CISC type and RISC type, thererfore, each of them can be provided with necessary data processing capability instead of distinction of the clock frequency. As for the microprocessor 2b, an IC of SH 7000 series incorporating an A/D converter produced by Hitachi Ltd., for example, can be used.

According to the present invention, the driver control system and the interface control system of a disk apparatus can be controlled by different microprocessors. Furthermore, by sealing these microprocessors in the same package, a compact small-sized disk apparatus can be realized.

What is claimed is:

1. A control unit of a disk apparatus for exercising at least positioning control of a head of the disk apparatus, control of reading/writing data from/to a disk via the head, and transfer control of data between the disk apparatus and an external device, said control unit comprising:

a first microprocessor capable of mainly exercising positioning control of the head and control for reading/writing data from/into the disk without depending upon control exercised by a second microprocessor different from the first microprocessor and in parallel thereto, so as to perform head positioning by using a servo signal recorded on a data recording surface of the disk or perform head positioning by using both a servo signal recorded on a disk face dedicated exclusively to servo signal and a servo signal recorded on a data recording disk surface;

a second microprocessor for exercising transfer control of data between the disk apparatus and an external device;

a range of clock frequency or instruction execution speed in which said second microprocessor is operable is or lower than a range of clock frequency or instruction execution speed in which said first microprocessor is operable;

said first microprocessor having a first interior or exterior type memory for storing information relating to head positioning control and control for reading or writing data from or into the disk;

said second microprocessor having a second interior or exterior type memory for storing at least information relating to transfer control of data; and said second memory having a capacity larger than that of said first memory.

2. A control unit of a disk apparatus according to claim 1, wherein said first microprocessor comprises an analog-to-digital (A/D) converter for converting said servo signal read out as an analog signal from the disk to a digital signal.

3. A control unit of a disk apparatus according to claim 1, wherein said first microprocessor and said second microprocessor are sealed into substantially one integrated circuit package.

4. A control unit of a disk apparatus for exercising at least positioning control of a head of the disk apparatus, control of reading/writing data from/to a disk via the head, and transfer control of data between the disk apparatus and an external device, said control unit comprising:

a first microprocessor capable of mainly exercising positioning control of the head and control for reading/writing data from/into the disk without depending upon control exercised by a second microprocessor different from the first microprocessor and in parallel thereto, so as to perform head positioning by using a servo signal recorded on a data recording surface of the disk or perform head positioning by using both a servo signal recorded on a disk surface dedicated exclusively to servo signal and a servo signal recorded on a data recording disk face;

a second microprocessor for exercising transfer control of data between the disk apparatus and an external device;

said first microprocessor having an instruction execution speed larger than that of said second microprocessor;

said first microprocessor having a first memory for storing information relating to head positioning control and control for reading or writing data from or into the disk;

said second microprocessor having a second memory for storing at least information relating to transfer control of data; and said second memory having a capacity larger than that of said first memory.

5. A control unit of a disk apparatus according to claim 4, wherein said first microprocessor comprises a reduced instruction set computer (RISC), said second microprocessor comprises a complex instruction set computer (CISC), and both chips of said first microprocessor and said second microprocessor are sealed in a single package.

6. A small-sized magnetic disk apparatus of 2.5 inch form factor size or less including a casing, a head disk assembly, and a control unit mounted on a circuit substrate disposed in the casing, said control unit exercising at least positioning control of a head of the disk apparatus, control of reading/writing data from/to a disk via the head, and transfer control of data between the disk apparatus and an external device, said control unit comprising:

a first microprocessor capable of mainly exercising positioning control of the head and control for reading/writing data from/into the disk without depending upon control exercised by a second microprocessor different from the first microprocessor and in parallel thereto, so as to perform head positioning by using a servo signal recorded on a data recording surface of the disk or perform head positioning by using both a servo signal recorded on a disk surface dedicated exclusively to servo signal and a servo signal recorded on a data recording disk face;

a second microprocessor for exercising transfer control of data between the disk apparatus and an external device;

said first microprocessor having an instruction execution speed equal larger than that of said second microprocessor and control for reading/writing data from/into the disk;

said first microprocessor having a first memory for storing information relating to head positioning control;

said second microprocessor having a second memory for storing at least information relating to transfer control of data; and said second memory having a capacity larger than that of said first memory.

* * * * *